United States Patent
Kim et al.

(10) Patent No.: US 10,589,395 B2
(45) Date of Patent: Mar. 17, 2020

(54) SYSTEM AND METHOD FOR DETECTING DAMAGED TOOL OF MULTI-AXIS HEAD MACHINING EQUIPMENT

(71) Applicants: Hyundai Motor Company, Seoul (KR); Kia Motors Corporation, Seoul (KR)

(72) Inventors: Ho-Hwan Kim, Busan (KR); Yoong-Je Park, Busan (KR); Dae-Han Choi, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/173,647

(22) Filed: Oct. 29, 2018

(65) Prior Publication Data

US 2019/0134766 A1  May 9, 2019

(30) Foreign Application Priority Data

Nov. 8, 2017  (KR) .......................... 10-2017-0147789

(51) Int. Cl.
  *B23Q 17/09*  (2006.01)
  *G08B 21/18*  (2006.01)
  *B23Q 39/00*  (2006.01)

(52) U.S. Cl.
  CPC ..... *B23Q 17/0957* (2013.01); *B23Q 17/0961* (2013.01); *G08B 21/187* (2013.01); *B23Q 2039/006* (2013.01)

(58) Field of Classification Search
  CPC ............ G05B 19/406; G05B 19/4065; G05B 2219/37233; G05B 2219/37252; G05B 2219/37256; G05B 2219/37536; G05B 2219/50276; B23Q 17/09; B23Q 17/0952; B23Q 17/0957; B23Q 17/0961; B23Q 2039/006; G08B 21/187
  See application file for complete search history.

(56) References Cited

U.S. PATENT DOCUMENTS

| | | | | |
|---|---|---|---|---|
| 4,442,494 A | * | 4/1984 | Fromson | G01N 3/58 340/680 |
| 4,694,686 A | * | 9/1987 | Fildes | G05B 19/4065 324/71.1 |
| 4,723,219 A | * | 2/1988 | Beyer | G05B 19/4067 318/572 |
| 4,786,220 A | * | 11/1988 | Fildes | G01N 3/56 408/11 |
| 2004/0217873 A1 | * | 11/2004 | Schweitzer | G05B 19/4065 340/680 |

(Continued)

*Primary Examiner* — Andrew W Bee
(74) *Attorney, Agent, or Firm* — Mintz Levin Cohn Ferris Glovsky and Popeo, P.C.; Peter F. Corless (57) ABSTRACT

A system for detecting a damaged tool of multi-axis head machining equipment includes multi-axis head machining equipment, and a damaged tool detecting device connected to the multi-axis head machining equipment to detect a damaged tool, the damaged tool detecting device being configured to measure a current and a current change amount of the multi-axis head machining equipment to monitor a machining load, and a derivative and machining energy of the machining load, so as to detect whether there is an abnormality in a plurality of tools mounted on a multi-axis head during machining.

15 Claims, 5 Drawing Sheets

(56) References Cited

U.S. PATENT DOCUMENTS

| | | | | |
|---|---|---|---|---|
| 2007/0124904 | A1* | 6/2007 | Muscarella | B23Q 5/341 29/27 C |
| 2012/0222001 | A1* | 8/2012 | Nakai | G05B 19/0426 717/110 |
| 2013/0272813 | A1* | 10/2013 | Bichsel | B23C 1/12 409/132 |
| 2017/0326697 | A1* | 11/2017 | Van Sprang | B23Q 5/10 |
| 2018/0113434 | A1* | 4/2018 | Shapiro | G05B 19/406 |

* cited by examiner

DAMAGE TO TOOL

SYSTEM AND METHOD FOR DETECTING DAMAGED TOOL OF MULTI-AXIS HEAD MACHINING EQUIPMENT

CROSS-REFERENCE TO RELATED APPLICATION(S)

This application claims under 35 U.S.C. § 119(a) the benefit of Korean Patent Application No. 10-2017-0147789, filed on Nov. 8, 2017, the entire contents of which are incorporated herein by reference.

BACKGROUND

(a) Technical Field

The present disclosure relates to a system and method for detecting a damaged tool of multi-axis head machining equipment, and more particularly, to the system and method for detecting the damaged tool capable of correctly detecting whether there is an abnormality in a plurality of tools mounted on a multi-axis head, using machining load monitoring, derivative monitoring, and energy monitoring.

(b) Description of Related Art

Multi-axis head machining equipment refers to equipment for machining a metallic workpiece and the like using a plurality of tools mounted on multi spindles thereof, and may include a spindle motor for rotating the multi spindles and a shaft feed motor for linearly moving the multi spindles.

In the multi-axis head machining equipment, some of the tools may be damaged during a machining operation, and in this case, due to the damaged tool, the equipment itself may be damaged or machining defects may be caused. To remedy this shortcoming, the multi-axis head machining equipment is equipped with a device for detecting a damaged tool.

The device for detecting a damaged tool of the machining equipment is divided into a contact-type device and a non-contact device.

Figure 1:
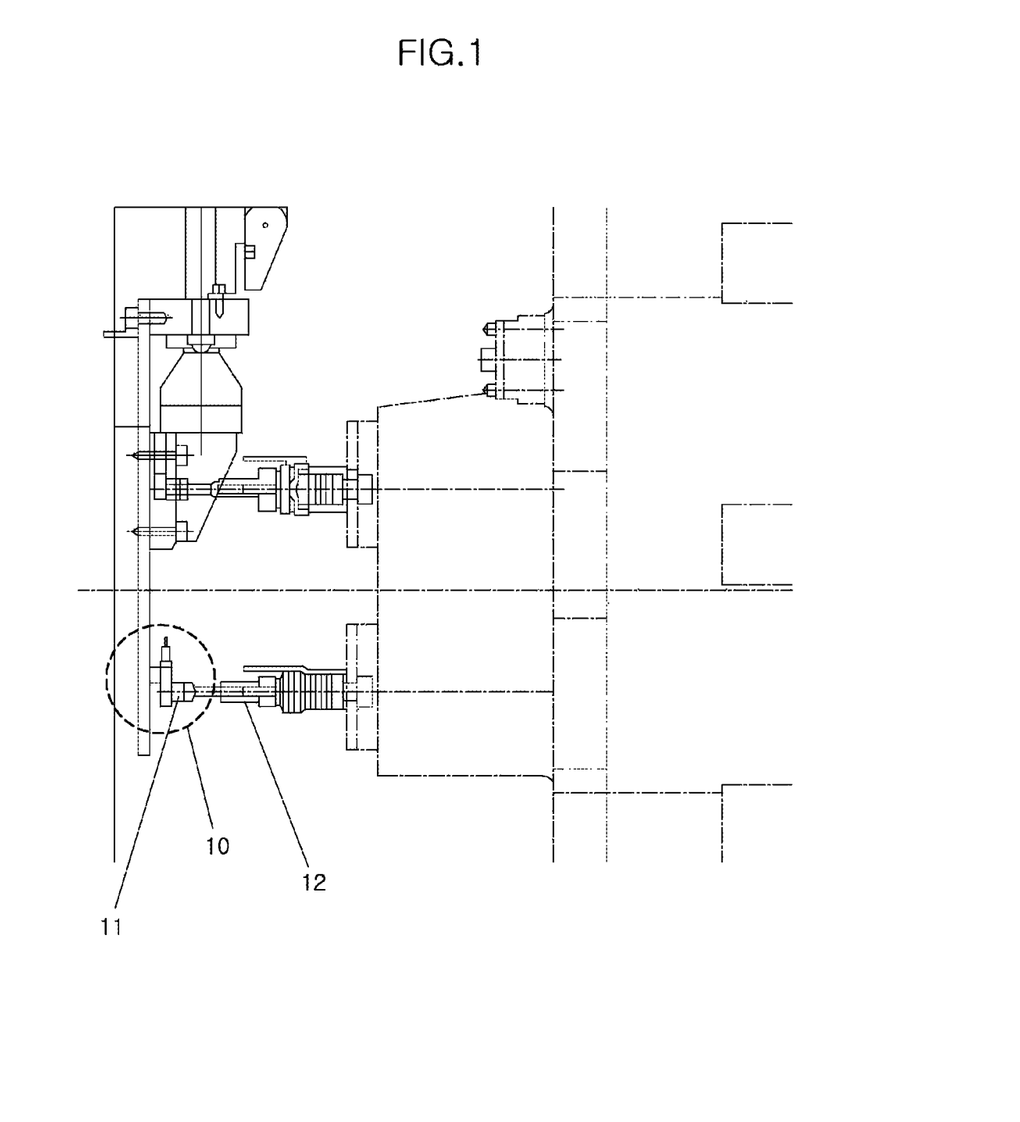
FIG. 1 (RELATED ART) is a view illustrating one example of a contact-type device for detecting a damaged tool according to the related art.

FIG. 1 (RELATED ART) is a view illustrating one example of a contact-type device for detecting a damaged tool. Referring to FIG. 1, a contact-type device 10 for detecting a damaged tool includes a damage detection sensor 11 which is in contact with a cutting tool 12 to detect a damaged tool. The above contact-type device 10 for detecting the damaged tool has a problem that since it is impossible to detect the damaged tool during machining, damage to equipment or machining defects cannot be fundamentally prevented during machining.

A non-contact type device for detecting a damaged tool is a device that detects overload exerted on a spindle shaft to predict whether a tool is damaged, and this device can detect the damaged tool even during machining. However, it is difficult for such a non-contact type device for detecting the damaged tool to be applied to a multi-axis head machining equipment composed of multi spindles and a single spindle motor, and this device has a problem that since it is difficult to detect a load applied to the spindle shaft during a machining operation in which a machining load is small, it is impossible to detect the damaged tool.

SUMMARY

The present disclosure provides a system and method for detecting a damaged tool of multi-axis head machining equipment, which are capable of correctly detecting whether there is an abnormality in a plurality of tools mounted on a multi-axis head, using conventional machining load monitoring as well as derivative monitoring and energy monitoring so as to allow a damaged tool to be detected during machining.

In order to achieve the above object, a system for detecting a damaged tool of multi-axis head machining equipment according to the present disclosure may include multi-axis head machining equipment; and a damaged tool detecting device connected to the multi-axis head machining equipment to detect a damaged tool, wherein the damaged tool detecting device may be configured to measure a current and a current change amount of the multi-axis head machining equipment to monitor a machining load, and a derivative and machining energy of the machining load, so as to detect whether there is an abnormality in a plurality of tools mounted on a multi-axis head during machining.

In the system for detecting a damaged tool of the multi-axis head machining equipment according to the present disclosure, the multi-axis head machining equipment may generate an alarm and move the tool backward when the abnormality of the tool is detected by machining load monitoring and derivative monitoring in the damaged tool detecting device.

In addition, the multi-axis head machining equipment may generate a tool replacement alarm at the time of terminating machining when the abnormality of the tool is detected by energy monitoring in the damaged tool detecting device.

In the system for detecting a damaged tool of the multi-axis head machining equipment according to the present disclosure, the multi-axis head machining equipment may include multi spindles configured to mount the plurality of tools thereon, a spindle motor configured to rotate the multi-spindle, a shaft feed motor configured to linearly move the multi-spindle, a current supplying device connected to the spindle motor and the shaft feed motor via a power line to supply a current to both motors, a programmable logic controller (PLC) circuit, and a programmable motion controller (PMC) circuit.

Further, the damaged tool detecting device may include a current measuring sensor being directly connected to the power line between the current supplying device of the multi-axis head machining equipment and the spindle motor or the shaft feed motor to measure the current and a current change amount, and a controller.

The controller may be configured to monitor the machining load, the derivative and the energy from the measured current and a current change amount of the power line.

The controller may be controlled by a numerical control (NC) machining program of the multi-axis head machining equipment, and may be signal-connected to a programmable logic controller (PLC) circuit and a programmable motion controller (PMC) circuit of the multi-axis head machining equipment via assigned input/output units.

The multi-axis head machining equipment may include an alarm responding circuit provided in the programmable logic controller circuit, and the alarm responding circuit may be signal-connected to the damaged tool detecting device to generate an alarm and move the tool backward when the damaged tool is detected during machining.

Meanwhile, a method for detecting a damaged tool of multi-axis head machining equipment according to the present disclosure may include initiating machining performed by the multi-axis head machining equipment; and by a damaged tool detecting device connected to the multi-axis head machining equipment, detecting whether there is an abnormality in a tool during machining of the multi-axis head machining equipment, wherein, in detecting whether there is an abnormality in the tool, machining load monitoring, derivative monitoring and energy monitoring may be sequentially performed by the damaged tool detecting device.

In machining load monitoring, derivative monitoring and energy monitoring, a current and the current change amount of the multi-axis head machining equipment may be measured to monitor the machining load, the derivative and the energy, respectively, thereby detecting whether there is an abnormality in the plurality of tools mounted on the multi-axis head.

At this time, the current and the current change amount of the multi-axis head machining equipment may be measured by a current measuring sensor of the damaged tool detecting device, which is directly connected to a power line between a current supplying device of the multi-axis head machining equipment and a spindle motor or a power line between the current supplying device of the multi-axis head machining equipment and a shaft feed motor.

In the method for detecting a damaged tool of the multi-axis head machining equipment according to the present disclosure, when the abnormality is detected in monitoring the machining load or in monitoring the derivative, a generation of alarm, an emergency backward movement and a termination of machining may be sequentially performed.

The generation of alarm, the emergency backward movement and the termination of machining may be performed by an alarm responding circuit provided in a programmable logic controller circuit in the multi-axis head machining equipment.

In the emergency backward movement, when the abnormality is detected, rotation of the tool may be immediately stopped and the tool may be moved backward far away from a workpiece.

In addition, when the abnormality is detected in monitoring the energy, the multi-axis head machining equipment may generate a tool replacement alarm at the time of terminating machining.

In accordance with the system and method for detecting the damaged tool of the multi-axis head machining equipment according to the present disclosure, by correctly detecting the damaged tool and immediately performing the emergency backward movement during machining performed in the machining equipment, an occurrence of machining defects and damage to the equipment caused by the damaged tool are prevented, so that an operation rate and productivity of the machining equipment can be enhanced.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system and a method for detecting a damaged tool of multi-axis head machining equipment according to the present disclosure will be described in detail with reference to the accompanying drawings.

Figure 2:
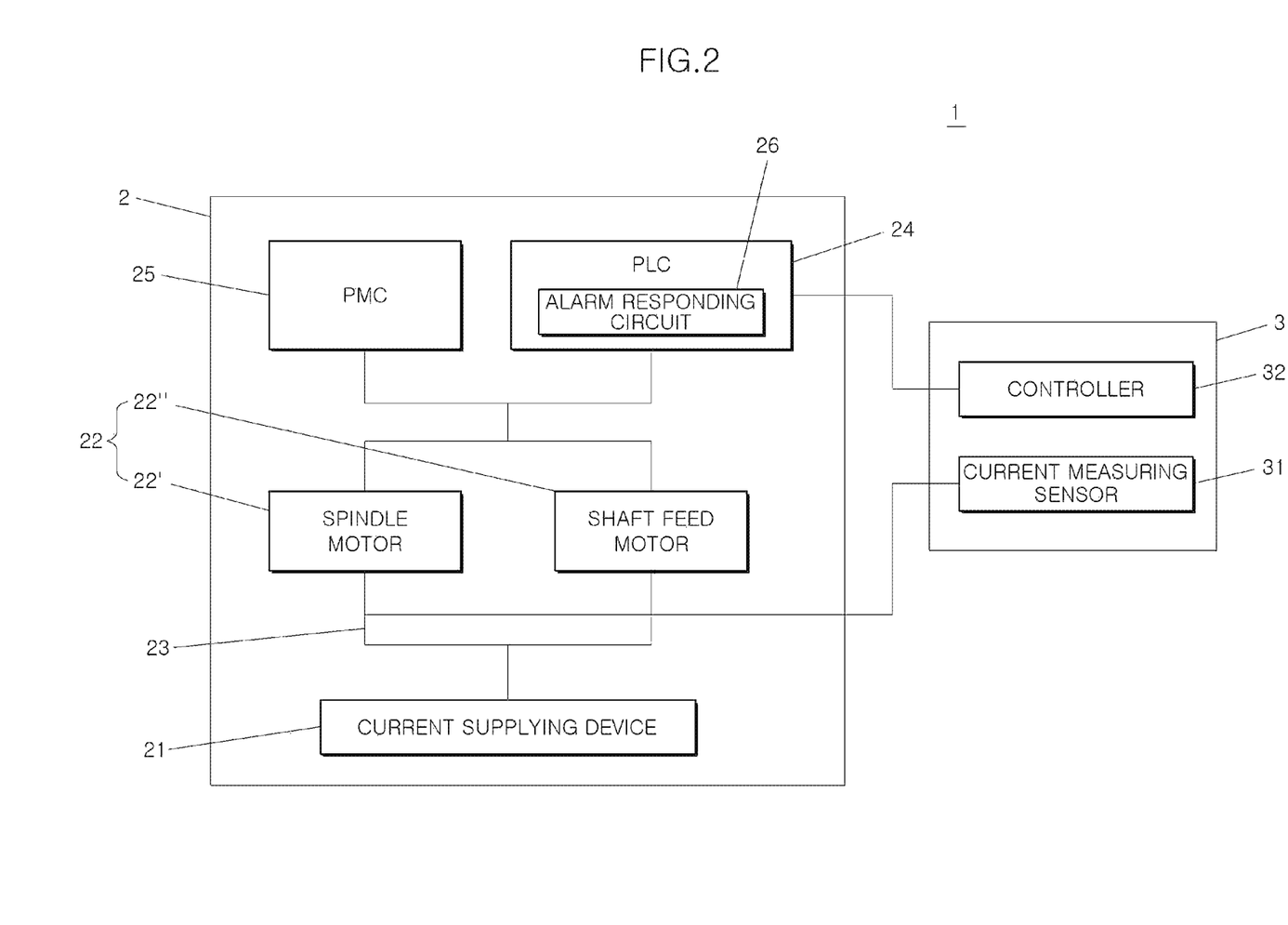
FIG. 2 is a schematic view of a configuration of a system for detecting a damaged tool of multi-axis head machining equipment according to the present disclosure.

FIG. 2 is a schematic view of a configuration of a system for detecting a damaged tool of multi-axis head machining equipment according to the present disclosure.

Referring to FIG. 2, a system 1 for detecting a damaged tool of multi-axis head machining equipment according to the present disclosure may include multi-axis head machining equipment 2 and a damaged tool detecting device 3 connected to the multi-axis head machining equipment 2 to detect the damaged tool.

The damaged tool detecting device 3 in the multi-axis head machining equipment according to the present disclosure includes a current measuring sensor 31 and a controller 32, and the current measuring sensor 31 is directly connected to a power line 23 between a current supplying device 21 and a drive motor 22 of the multi-axis head machining equipment 2 to measure a current and a current change amount.

Any one of a spindle motor 22' and a shaft feed motor 22" may be employed as the drive motor 22 whose current and current change amount are measured by the current measuring sensor 31, and any one motor suitable for monitoring according to machining operation or a shape of the tool is selected.

The controller 32 is controlled by a numerical control (NC) machining program of the multi-axis head machining equipment 2, and is signal-connected to a programmable logic controller (PLC) circuit 24 and a programmable motion controller (PMC) circuit 25 of the multi-axis head machining equipment 2 via assigned input/output units.

Meanwhile, the system 1 for detecting the damaged tool of the multi-axis head machining equipment according to the present disclosure includes an alarm responding circuit 26 provided in the PLC circuit 24 as shown in FIG. 2, which will be described later.

The damaged tool detecting device 3 of the multi-axis head machining equipment according to the present disclosure monitors not only a machining load (power), but also a derivative of the machining load, machining energy from the current, and the current change amount measured by the current measuring sensor 31 to detect whether there is an abnormality in a plurality of tools mounted on the multi-axis head during machining.

Figure 3:
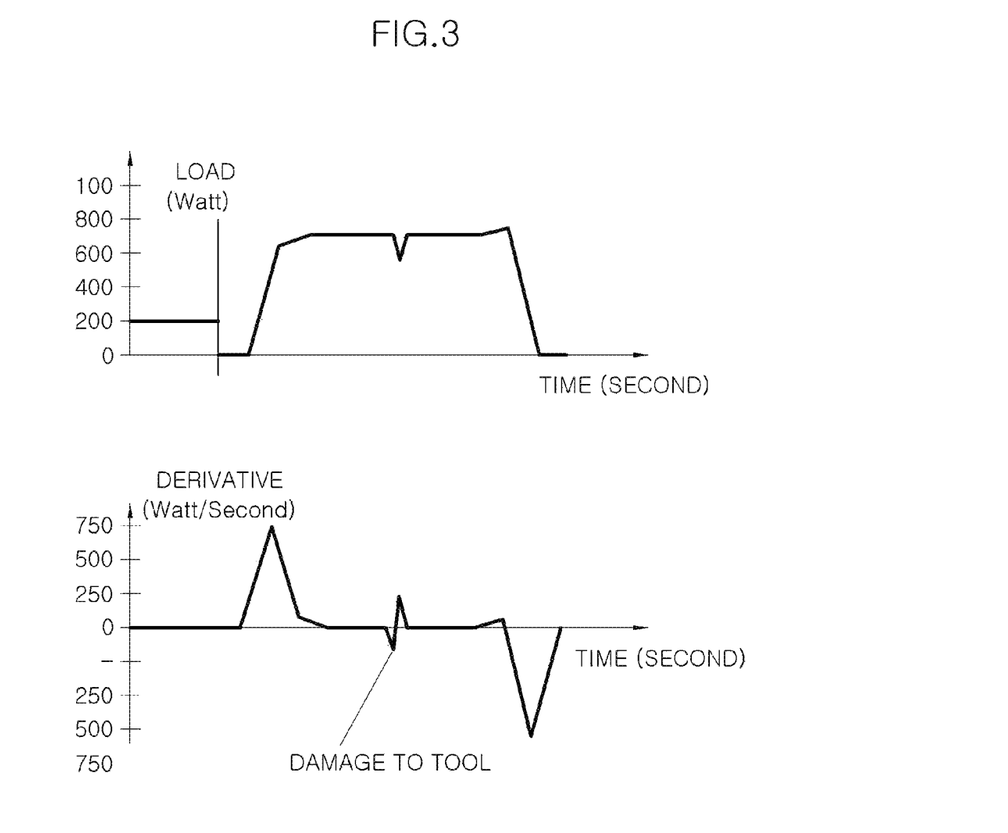
FIG. 3 is a view illustrating an example of a detection of a damaged tool performed by machining load monitoring and derivative monitoring in a damaged tool detecting device of the multi-axis head machining equipment according to the present disclosure.
Figure 4:
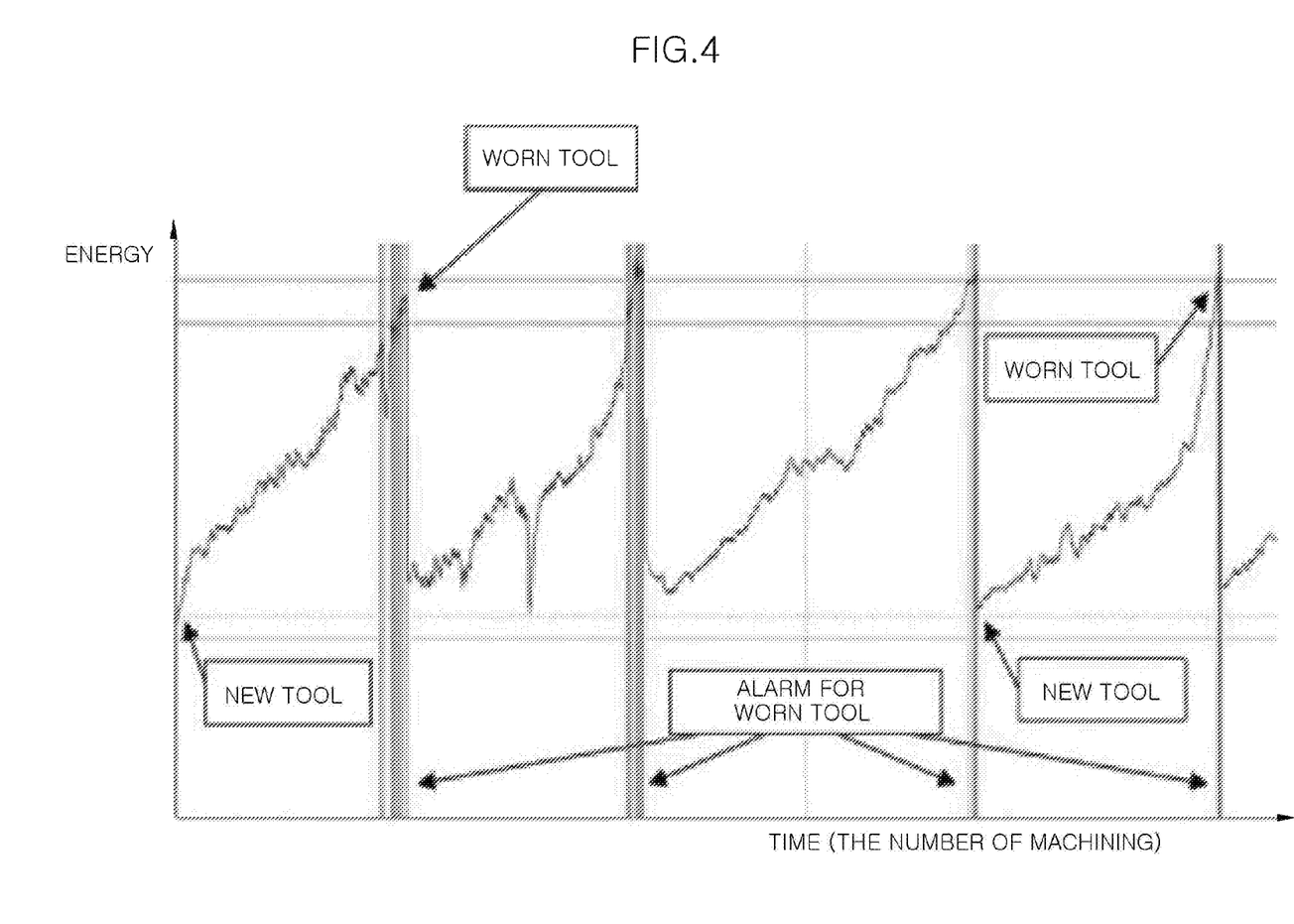
FIG. 4 is a graph illustrating an example of a detection of a cutting tool life performed by energy monitoring in the damaged tool detecting device of the multi-axis head machining equipment according to the present disclosure.

FIG. 3 is a view illustrating an example of a detection of a damaged tool performed by machining load monitoring and derivative monitoring in the damaged tool detecting device of the multi-axis head machining equipment according to the present disclosure, and FIG. 4 is a graph illustrating an example of a detection of a cutting tool life performed by energy monitoring in the damaged tool detecting device of the multi-axis head machining equipment according to the present disclosure.

Referring to FIG. 3, the damaged tool detecting device 3 of the multi-axis head machining equipment according to the present disclosure may monitor abnormal fluctuation of the machining load, that is, the power value during machining to detect the damaged tool. In addition to the above, by monitoring the abnormal fluctuation with respect to the derivative of the power value, it is possible to accurately detect even a finely damaged tool which cannot be detected only by monitoring the machining load.

In particular, the derivative of the power value fluctuates greatly when the tool is in contact with and disengaged from a workpiece and when the tool is damaged. Unlike the case where the tool is in contact with and disengaged from the workpiece (peaks formed on the right and left sides in FIG. 3), the derivative of the power value is changed from a negative value to a positive value when the tool is damaged. Therefore, it is possible to detect the damaged tool by monitoring such a change.

In addition, referring to FIG. 4, the damaged tool detecting device 3 of the multi-axis head machining equipment according to the present disclosure may monitor energy (i.e., the product of the power value and time), which is used for machining in every machining cycle to detect the worn tool and a tool replacement time. That is, the energy used for machining is increased as wear of the tool is progressed, so that it is possible to detect the tool replacement time by comparing the above energy with an upper limit value of predetermined machining energy.

Figure 5:
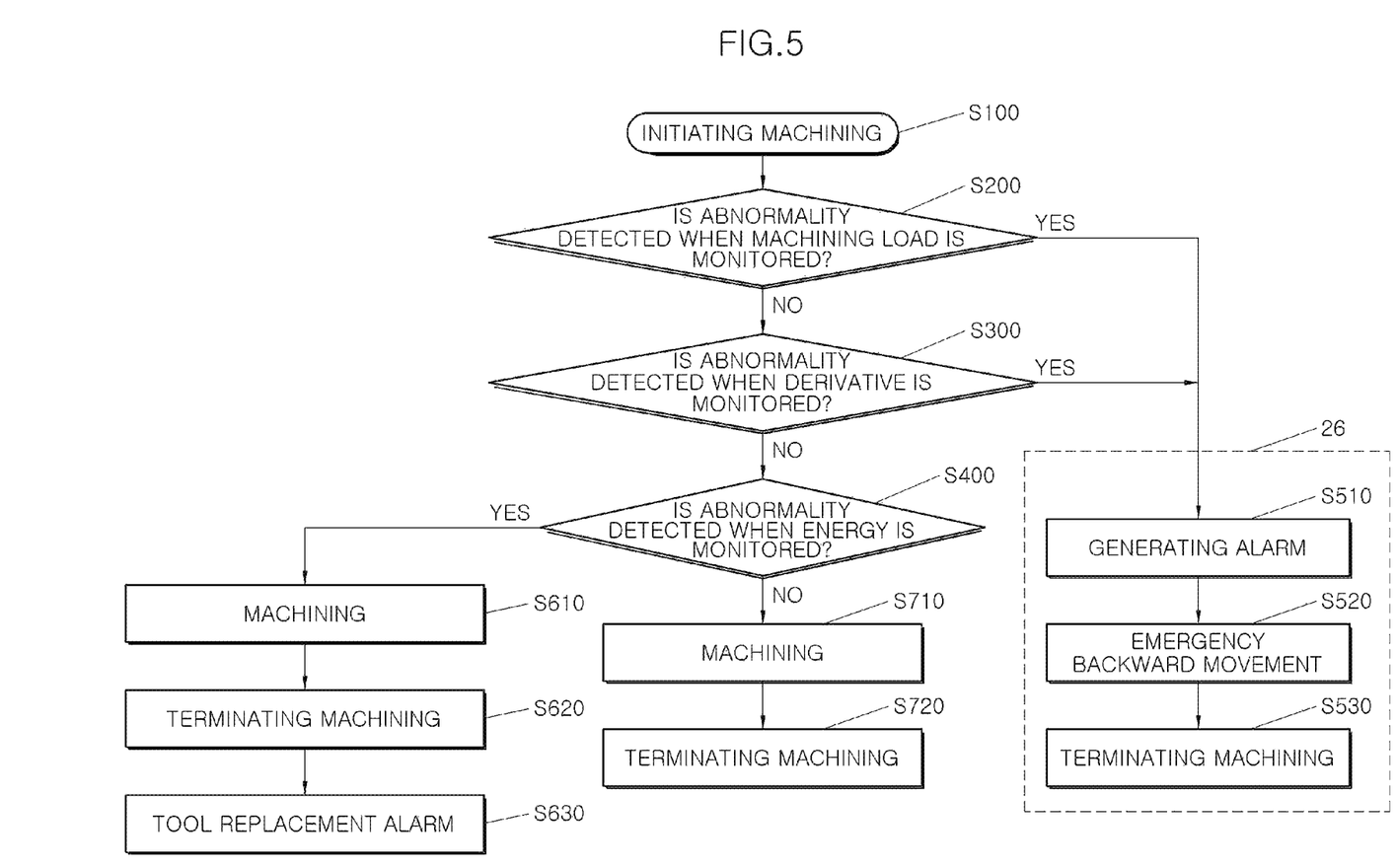
FIG. 5 is a flow chart illustrating a method for detecting a damaged tool of the multi-axis head machining equipment according to the present disclosure.

FIG. 5 is a flow chart illustrating a method for detecting the damaged tool of the multi-axis head machining equipment according to the present disclosure.

Referring to FIG. 5, in the method for detecting the damaged tool of the multi-axis head machining equipment according to the present disclosure, a machining initiating step S100, a machining load monitoring step S200, a derivative monitoring step S300, and an energy monitoring step S400 are sequentially executed.

At this time, when an abnormality is detected in the machining load monitoring step S200 or the derivative monitoring step S300, an alarm generating step S510, an emergency backward-moving step S520, and a machining terminating step S530 are sequentially executed. Here, the emergency backward-moving step S520 is a step for preventing secondary damage to the damaged tool or ensuing damage to another tool. In this step, when the abnormality is detected, rotation of the tool is immediately stopped, and the tool is moved backward far away from the workpiece.

The system 1 for detecting the damaged tool of the multi-axis head machining equipment according to the present disclosure may include the alarm responding circuit 26 for the emergency backward movement, and the alarm responding circuit 26 is provided in the PLC circuit 24 of the multi-axis head machining equipment 2, not in the controller 32 of the damaged tool detecting device 3, so as to prevent a time delay of the emergency backward movement caused by a signal delay. When the alarm responding circuit 26 is provided on the controller 32 or is provided as an emergency backward movement program in the NC machining program, a time delay of the emergency backward movement occurs, so that it is difficult to avoid secondary damage to the damaged tool or ensuing damage to another tool.

Meanwhile, when the abnormality is detected in the energy monitoring step S400, machining in the step S610 is terminated, and a tool replacement alarm is then generated (step S630) when machining is terminated (step S620).

In accordance with the system and the method for detecting the damaged tool of the multi-axis head machining equipment according to the present disclosure as described above, by correctly detecting the damaged tool during machining performed in the multi-axis head machining equipment and immediately performing the emergency backward movement, the occurrence of machining defects and damage to the equipment caused by the damaged tool are prevented, thereby improving the operation rate and productivity of the machining equipment.

Although the present disclosure has been described with a focus on novel features of the present disclosure applied to various embodiments, it will be apparent to those skilled in the art that various deletions, substitutions, and changes in the form and details of the apparatus and method described above may be made without departing from the scope of the present disclosure. Accordingly, the scope of the present disclosure is defined by the appended claims rather than by the foregoing description. All modifications within the equivalent scope of the appended claims are embraced within the scope of the present disclosure.

What is claimed is:

1. A system for detecting a damaged tool of multi-axis head machining equipment, comprising:
   multi-axis head machining equipment; and a damaged tool detecting device connected to the multi-axis head machining equipment to detect a damaged tool, wherein the damaged tool detecting device is configured to measure a current and a current change amount of the multi-axis head machining equipment to monitor a machining load, and a derivative and machining energy of the machining load, so as to detect whether there is an abnormality in a plurality of tools mounted on a multi-axis head during machining, and wherein the multi-axis head machining equipment comprises:
multi spindles configured to mount the plurality of tools thereon;
a spindle motor configured to rotate the multi spindles;
a shaft feed motor configured to linearly move the multi spindles;
a current supplying device connected to the spindle motor and the shaft feed motor via a power line to supply a current to both motors;
a programmable logic controller (PLC) circuit; and
a programmable motion controller (PMC) circuit.

2. The system of claim 1, wherein the multi-axis head machining equipment is configured to generate an alarm and to move the tool backward when the abnormality of the tool is detected by monitoring the machining load and the derivative in the damaged tool detecting device.

3. The system of claim 1, wherein the multi-axis head machining equipment is configured to generate a tool replacement alarm at the time of terminating machining when the abnormality of the tool is detected by monitoring the machining energy in the damaged tool detecting device.

4. The system of claim 1, wherein the damaged tool detecting device comprises:
a current measuring sensor being directly connected to the power line between the current supplying device of the multi-axis head machining equipment and the spindle motor or the shaft feed motor to measure the current and the current change amount; and
a controller.

5. The system of claim 4, wherein the controller is configured to monitor the machining load, the derivative and the machining energy from the measured current and a current change amount of the power line.

6. The system of claim 5, wherein the controller is controlled by a numerical control (NC) machining program of the multi-axis head machining equipment, and is signal-connected to a programmable logic controller (PLC) circuit and a programmable motion controller (PMC) circuit of the multi-axis head machining equipment via assigned input/output units.

7. The system of claim 1, wherein the multi-axis head machining equipment comprises an alarm responding circuit provided in the programmable logic controller circuit.

8. The system of claim 7, wherein the alarm responding circuit is signal-connected to the damaged tool detecting device to generate an alarm and move the tool backward when the damaged tool is detected during machining.

9. A method for detecting a damaged tool of multi-axis head machining equipment, the method comprising:
initiating machining performed by the multi-axis head machining equipment; and
by a damaged tool detecting device connected to the multi-axis head machining equipment, detecting whether there is an abnormality in a tool during machining of the multi-axis head machining equipment,
wherein, in detecting whether the abnormality is present in the tool, machining load monitoring, derivative of the machining load monitoring and energy of the machining load monitoring are sequentially performed by the damaged tool detecting device.

10. The method of claim 9, wherein, in the machining load monitoring, the derivative of the machining load monitoring and the energy of the machining load monitoring, a current and a current change amount of the multi-axis head machining equipment are measured to monitor a machining load, a derivative and energy, respectively, thereby detecting whether the abnormality is present in the plurality of tools mounted on the multi-axis head.

11. The method of claim 10, wherein the current and the current change amount of the multi-axis head machining equipment are measured by a current measuring sensor of the damaged tool detecting device, which is directly connected to a power line between a current supplying device of the multi-axis head machining equipment and a spindle motor or a power line between the current supplying device of the multi-axis head machining equipment and a shaft feed motor.

12. The method of claim 9, wherein when the abnormality is detected in monitoring a machining load or in monitoring a derivative of the machining load, a generation of alarm, an emergency backward movement and a termination of machining are sequentially performed.

13. The method of claim 12, wherein the generation of alarm, the emergency backward movement and the termination of machining are performed by an alarm responding circuit provided in a programmable logic controller circuit in the multi-axis head machining equipment.

14. The method of claim 13, wherein in the emergency backward movement, when the abnormality is detected, rotation of the tool is immediately stopped and the tool is moved backward far away from a workpiece.

15. The method of claim 9, wherein when the abnormality is detected in monitoring the energy of the machining load, the multi-axis head machining equipment generates a tool replacement alarm at the time of terminating machining.

* * * * *